(12) United States Patent
Naqvi et al.

(10) Patent No.: US 11,763,171 B2
(45) Date of Patent: Sep. 19, 2023

(54) SYSTEM AND METHODS FOR MODULATING DISSEMINATION OF CONTENT TO MOBILE DEVICES AND ROBOTS

(71) Applicant: Safelishare, Inc., Morristown, NJ (US)

(72) Inventors: Shamim A. Naqvi, Morristown, NJ (US); Robert Frank Raucci, New York, NY (US)

(73) Assignee: SAFELISHARE, INC., Morristown, NJ (US)

( * ) Notice: Subject to any disclaimer, the term of this patent is extended or adjusted under 35 U.S.C. 154(b) by 845 days.

(21) Appl. No.: 16/483,918

(22) PCT Filed: Feb. 23, 2017

(86) PCT No.: PCT/US2017/019023
§ 371 (c)(1),
(2) Date: Aug. 6, 2019

(87) PCT Pub. No.: WO2018/156130
PCT Pub. Date: Aug. 30, 2018

(65) Prior Publication Data
US 2020/0097837 A1 Mar. 26, 2020

(51) Int. Cl.
*G06N 5/02* (2023.01)
*H04L 9/40* (2022.01)

(52) U.S. Cl.
CPC ........... *G06N 5/02* (2013.01); *H04L 63/0428* (2013.01)

(58) Field of Classification Search
CPC .............................. G06N 5/02; H04L 63/0428
See application file for complete search history.

(56) References Cited

U.S. PATENT DOCUMENTS

| | | | |
|---|---|---|---|
| 9,087,451 B1 | 7/2015 | Jarrell | |
| 9,521,453 B2 | 12/2016 | Gharaat | |
| 10,171,941 B2 | 1/2019 | Masano | |
| 11,049,133 B1* | 6/2021 | Huang | G06Q 30/0249 |
| 2003/0063072 A1 | 4/2003 | Brandenberg | |
| 2007/0299681 A1 | 12/2007 | Plastina | |
| 2009/0282001 A1 | 11/2009 | Fukuda | |
| 2011/0143779 A1 | 6/2011 | Rowe | |
| 2011/0197237 A1 | 8/2011 | Turner | |
| 2011/0287709 A1* | 11/2011 | Brown | G06Q 30/0239 455/3.01 |
| 2011/0294520 A1 | 12/2011 | Zhou | |
| 2012/0102113 A1 | 4/2012 | Chartier | |

(Continued)

*Primary Examiner* — Jeong S Park

(57) ABSTRACT

A method of controlling dissemination of content to communication devices over one or more communication networks includes receiving, by a content dissemination mechanism, a message reflecting a user-initiated action that is to cause dissemination of a given content item to a plurality of communication devices each associated with a user. Responsive to the message, a group of communication devices is identified to which the given content item is to be disseminated. A first subset of the identified group is determined. The content item is disseminated to a first subset of communication devices in the identified group. The determining is based at least in part on a first ratings formula derived at least in part from ratings of the given content item provided by users to whom the given content item has already been disseminated.

19 Claims, 9 Drawing Sheets

(56) References Cited

U.S. PATENT DOCUMENTS

| | | | |
|---|---|---|---|
| 2012/0233640 A1 | 9/2012 | Odryna | |
| 2012/0316953 A1 | 12/2012 | Ramchandani | |
| 2013/0081083 A1 | 3/2013 | Yu | |
| 2014/0025847 A1 | 1/2014 | Choi | |
| 2014/0068440 A1 | 6/2014 | Wiltzius | |
| 2014/0258405 A1 | 9/2014 | Perkin | |
| 2014/0304075 A1 | 10/2014 | Dillingham | |
| 2014/0344050 A1* | 11/2014 | McKinley | G06Q 30/0267 705/14.45 |
| 2015/0039698 A1 | 2/2015 | Mavalankar | |
| 2015/0095416 A1 | 4/2015 | Abiri | |
| 2015/0149287 A1 | 5/2015 | Brown | |
| 2016/0269345 A1* | 9/2016 | Weizman | H04L 51/214 |
| 2016/0379272 A1* | 12/2016 | Reis | G06Q 30/0251 705/14.55 |
| 2017/0169113 A1* | 6/2017 | Bhatnagar | G06F 16/9535 |
| 2019/0028743 A1* | 1/2019 | He | H04N 21/2225 |

* cited by examiner

| STEP | ACTION | | |
|---|---|---|---|
| 1 | CONFIGURE CONTENT STORE TO CONTAIN CONTENT ASSOCIATED WITH RATINGS AND MODULATION FACTORS | | |
| 2 | CONFIGURE CONTENT STORE TO CONTAIN LIST OF USER, EACH USER BEING ASSOCIATED WITH ONE OR MORE "FRIENDS" | | |
| 3 | CONFIGURE CONTENT STORE TO RECEIVE RATINGS FROM ONE OR MORE USER DEVICES | | |
| 4 | CONFIGURE CONTENT STORE TO GENERATE MODULATION FACTORS | | |
| 5 | DO THE FOLLOWING STEPS FOR EACH USER WHO POSTS CONTENT. RECEIVE NEW CONTENT "c" TO BE DELIVERED TO INTENDED AUDIENCE IA, ASSIGN DEFAULT "r" & "mf"; CREATE (c, r, mf); INTEGRATE IT INTO THE CONTENT STORE | | |
| 6 | COMPUTE GROUP G FROM IA; DEVELOP AND OUTPUT FIRST WAVE OF DELIVERY SCHEDULE FOR "c" BASED ON DEFAULT VALUES OF r & mf | | |
| 7 | EXECUTE THE FOLLOWING THREE SUB-METHODS CONTEMPORANEOUSLY UNTIL IA IS SATISFIED | | |
| 8 | METHOD "R" | METHOD "CSI" | METHOD "M" |
| | R-8A: DO FOREVER{ | CSI-8A: REPEAT { | M-8A: DO FOREVER{ |
| | R-8B: RECEIVE c FROM USER; READ LATEST "F2" FROM PROCEDURE "M" | CSI-8B: READ (c, mf) FROM "M". | M-8B: READ "F1" FROM PROCEDURE "R" FOR RATING "r" OF "c" |
| | R-8C: CALCULATE NEW "r" (FORMULA F1) | CSI-8C: READ (c, r) FROM "R"; COMPUTE NEW IA | M-8C: GENERATE NEW "mf" (FORMULA F2) |
| | R-8D: ASSOCIATE NEW "r" WITH "c" & STORE IN LOCAL MEMORY} | CSI-8D: INTEGRATE (c, r, mf) INTO CONTENT STORE | M-8D: ASSOCIATE NEW "mf" WITH "c" & STORE IN LOCAL MEMORY} |
| | | CSI-8E: UPDATE IA WITH NEW IA; CREATE G. | |
| | | CSI-8F: REPEAT { PARTITION G INTO NEXT-WAVE AND NEXT-G DELIVER NEXT-WAVE SET G TO NEXT-G } UNTIL G BECOMES EMPTY UNTIL IA BECOME EMPTY | |

*FIG. 3*

SYSTEM AND METHODS FOR MODULATING DISSEMINATION OF CONTENT TO MOBILE DEVICES AND ROBOTS

BACKGROUND

The process of disseminating content forms the lifeblood of social and messaging networks on the Internet. The grouping function of messaging systems such as WhatsApp, the "tweet" and "followers" feature of Twitter, and the "like" and "friends" feature of Facebook are all examples of dissemination mechanisms that are in use today.

Many content dissemination mechanisms do not have any checks on the validity of the content being disseminated and/or its relevance to the receiving devices. In some cases, this is shown to lead to the problem of "fake news" in which misleading or false content is disseminated. Many observers have commented on the deleterious effects of fake news on society. Certain social networking companies have announced efforts to control the problem by fact-checking posted content. A solution to the fake news problem would thus be of considerable social value. Improving the dissemination by making it more relevant to recipient devices will also reduce network traffic and load on recipient devices. Thus, both technical and social issues will be addressed by such inventions.

SUMMARY

In one aspect, the subject matter described herein allows various types of content to be disseminated to user communication devices whereby improving the dissemination mechanism with respect to validity and pertinence (to a receiver) of content. In some embodiments, a modulating function is used to control the dissemination of information based on a dynamic rating metric. In certain embodiments, the rating may also refer to relevance or statistical measures. In one embodiment, the modulating function and rating metric operate in a cooperative scheme, e.g., as co-routines, each impacting the other, i.e., changes in the rating metric cause the modulating function to be activated and changes in the modulating function cause changes in the rating metric. Thus, the rating metric and the modulating function may be tied by a symmetry of their operational behavior.

Moreover, in some embodiments both the rating metric and the modulating function are shown to be immune to gaming and other attacks. In one embodiment, the stated immunity is achieved by use of cryptographic techniques, interactive proofs and block chain ledger-based systems. In one embodiment, the rating metric and modulating function are implemented as elements in a private data network, e.g., as elements of the "http" protocol of the Internet. The disclosed subject matter is shown to be applicable to a diverse set of problems through non-limiting illustrative examples such as the dissemination of content in social networks, the activation of control processes in autonomous mobile robots, and sensor data flow in decision-making networks comprised of smart nodes.

BRIEF DESCRIPTION OF THE DRAWINGS

FIG. 3 shows one example of a method that may be employed by a content dissemination mechanism for disseminating content to the communication devices of users.

DETAILED DESCRIPTION

Content Dissemination

Figure 1:
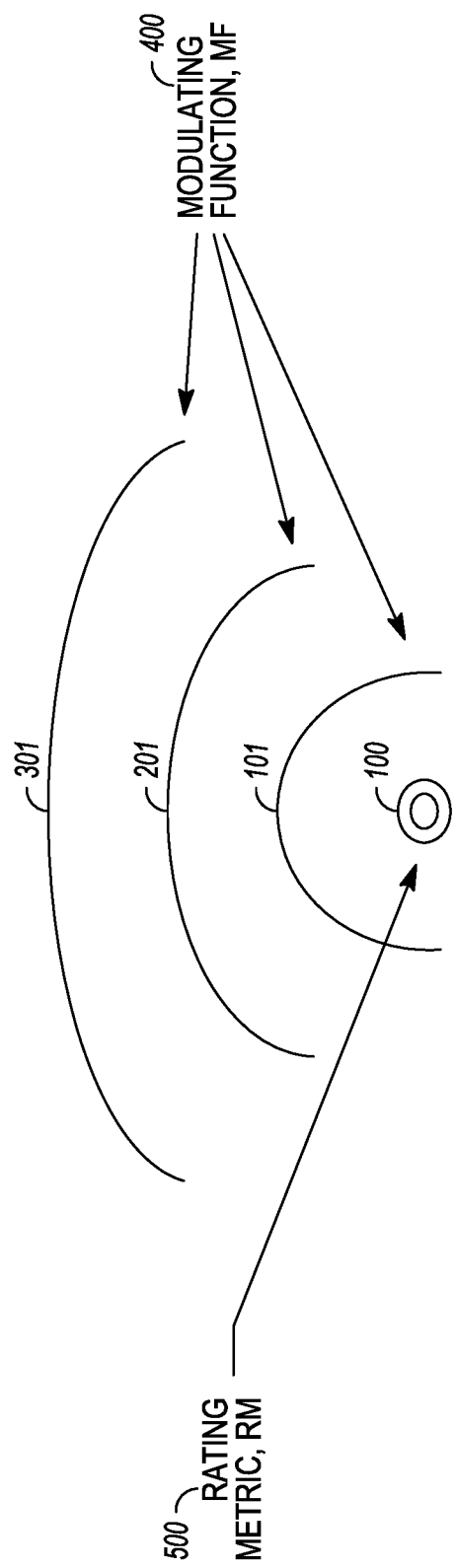
FIG. 1 shows one example of a content dissemination among a network of communication devices.

The following detailed descriptions are made with respect to inventions that are fully specified by the claims herein and not the various illustrative embodiments, the primary purposes of which are pedagogical.

Social networking and messaging websites are extremely popular amongst large swathes of the public and garner worldwide audiences. A salient feature provided by the underlying systems of such websites is that posted content may be further disseminated to other users.

We begin by first describing several prominent examples of current social networks and messaging systems from the point of view of user generated content.

First, consider the popular Twitter system that allows users to "follow" a user. Typically, users may select to follow a person (e.g., a celebrity), i.e., a user may choose to follow another user. When a user with a "following group of users" posts a message, i.e., he tweets a message, his posted message is sent to his followers. A follower who receives the message may then re-tweet the same message to his followers in turn. The re-tweeting process may be viewed as a mechanism by which posted content is further disseminated.

Second, consider the popular system called Facebook in which a user may specify his friends. Thus, a group of friends may exist for a given user. When a user posts a message or content, his friends are alerted to the message. His friends may indicate that they "like" the posted content in which case their respective group of friends, in turn, is also alerted. In this way, the "like" feature of Facebook may be viewed as a content dissemination mechanism.

It is to be noted that whereas Facebook and Twitter have different grouping mechanisms, their content dissemination mechanisms have the same purpose, i.e., disseminate content to more and more user communication devices. In some circles, this has been referred to as the "network effect".

Finally, in messaging systems, like WhatsApp, a user may create a group of users, e.g., a user may create a group comprising his "Saturday night book reading club" of users.

He may then forward content to the group members who, in turn, may forward the content to other groups and users.

We thus see that Twitter, Facebook and WhatsApp may be viewed as supporting mechanisms that disseminate content to (groups of) users.

We need to distinguish between content dissemination mechanisms as disclosed in the present invention and content distribution networks such as cable systems, content caching networks such as Akamai, etc.

Content distribution networks such as cable and satellite networks consist of hardware and software systems that transmit content from one or more source nodes to multiple receiving terminals. The transmission technology is usually a broadcast mechanism.

Another type of content distribution happens in systems that are perhaps better described as "content replication" networks, of which Akamai is a prominent example. In such networks, computers called Points of Presence (POPs) are used to store, i.e., cache, copies of "popular" or in-demand content. The POPs are typically located "close" to high-demand locations. A client device that requests content is served cached content from a "nearby" POP. If a requested content is not cached, i.e., a cache-miss occurs, the user request is served from a central server.

In view of the present invention, a content dissemination mechanism is a method by which content is disseminated to a group of user communication devices, called the intended audience. User communication devices typically comprise smart phones, tablets, Personal Digital Assistants, etc. A user device posts content to a server (typically a complex of machines) over one or more communication networks (e.g., the Internet). The server implements a content dissemination mechanism that further transmits the posted content to a group of users (identified by their user communication devices). As explained above, the groups may come into existence through different mechanisms. The transmission may use broadcast or other networking technologies. The content may be text, audio, video, multimedia, etc.

Current content dissemination mechanisms do not necessarily involve processing the content as to its validity or relevance.

Problems have been noticed by society and the technical user community in that a fake, salacious or sensational piece of content may be posted that catches the attention of some followers who may then cause further disseminations, resulting in a viral spreading of the original content, even though the latter may be inaccurate, false or deliberately misleading. This phenomenon has been referred to as the "fake news" problem.

Furthermore, fake content that goes viral causes high traffic load in the network and wastes network and client/device resources. Users need to constantly process received content that is wasteful of their time and the resources of their mobile devices such as its battery life. If fake news can be identified, the concomitant dissemination may be curbed, thus improving network utilization, performance and efficiency.

FIG. 1 shows a graphical representation of content dissemination to a group of user communication devices 200. A user device triggers a content dissemination mechanism (50), e.g., by a re-tweet or "like", etc. This action begets an intended audience 100. A content dissemination mechanism identifies a first group of recipients ("wave 1" shown as 101) who are delivered the content. This first wave is followed by a second (201) and a third (301), etc., until the intended audience group is empty, i.e., content has been delivered to the intended audience.

In the case, wherein the disseminated content may be incorrect or false, the waves may be deemed responsible for spreading spurious information. One way to manage the spreading of false information, as proposed in prior art, may be to fact-check the original posted content. A fact-checked piece of content may then be assigned a score indicative of its veracity as ascertained by the fact-checkers, e.g., a group of editors. It has been proposed that such problematic content may then be marked accordingly to alert the recipients. Content so marked is still disseminated but recipients may be alerted to the veracity of the received content, e.g., the content may contain a warning message.

There are several problems with the afore-mentioned approach. Firstly, all posted content needs to be fact-checked or some pieces of problematic content will slip through. Alternatively, one may fact-check selected content, i.e., by looking at fast-trending content only. However, in such a case, since trend detection has inherent latency, it may be too late to fact-check trending information. One may also fact-check postings by selected senders but that approach assumes one knows the identity of the suspected users. Such a method is quite unlikely to work since identities on the Internet can be easily faked.

Secondly, this approach may place a very high burden of work on the fact-checkers. The situation may be alleviated somewhat using machine-based fact-checkers but this may require further novelty and invention.

Finally, this approach introduces a latency in the posting process since the posted content must be fact-checked before it can be disseminated.

We observe that a posted false content with limited dissemination may not be as deleterious as another version of the same false content that gets wider dissemination. Thus, dissemination worsens the deleterious effects of false or misleading content. In common parlance, a false bit of news believed by a few people may not amount to much but false news believed by millions may indeed be quite harmful. Some observers have remarked that fake news propagates much faster than truth.

Furthermore, disseminating content that is irrelevant to a receiver is wasteful of network resources and device efficiency. By disseminating content that can alert a user to its probabilistic inaccuracy may disincline a user from further disseminations, thus reducing the network load.

The present invention proposes a pair of cooperating processes, i.e., methods, to control the dissemination of content. The first function in the pair is called the rating metric, RM. Content delivered to a recipient invites the latter to rate the received content, the rating in question being communicated back to the content dissemination mechanism. The returned ratings are integrated into a composite rating and are used to control the size (i.e., number of users) of the next outgoing wave.

The second function in the pair is called the modulation factor (MF). It controls the composition of the next outgoing wave, i.e., which users get selected in the next wave from the intended audience group.

Both MF and RM will be shown to operate in a cooperative manner, each providing input to the other and being impacted by data received from the other function. Such cooperative behavior is well-known wherein the functional entities are referred to as co-routines. In a subsequent section of our exposition, we will elaborate on an implementation of the functions RM and MF.

The general idea behind MF and RM may now be explained as follows. We use re-tweet as a specific exemplary user-initiated mechanism that triggers dissemination of content, but note that this does not limit our invention in any manner.

Re-tweeted content, C, begets an intended audience. We split the intended audience into a series of waves. Each wave has a size and a composition. The first wave is assigned a size and composition based on default values of the rating metric RM and the modulating factor, respectively.

Example: Consider a user who has a large following, say 1 million, of Twitter users who have downloaded the Twitter app, used it to register with Twitter, and provided their state of residence during the registration procedure. A Twitter user now receives a posted message and re-tweets it to his followers. Let the size of a first wave from the intended audience of 1 million be ten thousand. We arrive at this size by recourse to a function called the rating metric that, initially, uses a default value for the "size" parameter. Next, assume we partition the 1 million intended audience into partitions by "state of residence" and assign, initially, the same probability value to each partition, say 2%. That is, if there are 50 partitions based on state of residence, i.e., 50 states, then the selection function may choose 200 members from each state (partition). Simply stated, we may decide the first wave to be ten thousand users that are composed of 200 randomly selected users from each of 50 states (200× 50=10000 users in first wave chosen randomly from each state). Since each partition (state) has the probability value 2%, it contributes equally to the first wave.

For subsequent waves, as will be explained later, we may change the probability values associated with one or more partitions, hence changing their contribution to the wave. The members chosen to be in a wave comprise the composition of the wave and the number of members in a wave comprises the size of the wave.

Example: We use a weighted probability biased to select larger number of users from the mid-west states and lesser numbers from the Eastern seaboard states. We may also, in other examples, partition by gender and bias the (probabilistic) selection function to select more females and less males, etc.

We may also assign probabilities to the partitions randomly.

The individual selection probabilities assigned to all partitions may be combined (per a formula described later) to get the modulation factor for a wave.

The present invention proposes that when members of the first wave receive content on their user communication devices, e.g., the Twitter app, programmed circuitry in the app/device invites recipients of content to submit ratings regarding the received content. These ratings are returned to the content dissemination mechanism where they are integrated to produce a composite rating according to a formula described later. This composite rating will determine the size of the subsequent wave.

Consider a partition "P" of an intended audience group. Assume N2 members of this partition receive content and N1 rate it, returning the content to the dissemination system. We call the ratio N1/N2 as the return ratio for partition P. As will be disclosed, the return ratio of a partition will be used to determine the composition of the next wave.

Thus, in some embodiments the present invention proposes that the rating metric use the values of the ratings returned by recipients to determine the size of the next wave. Similarly, in some embodiments the modulation function is proposed to use the return ratios to determine the composition of the next wave. That is, in some cases the rating metric and the modulation function may not operate independently of each other.

Example: Consider disseminated content "c" to an intended audience group that has been partitioned into several partitions and that the content gets a high rating value from recipients. We would then prefer to examine if the high ratings are due to users from a few partitions. For example, if the partitions were based on geographical regions then, possibly, a local geographic effect may be causing the higher ratings. Similarly, a low return ratio may possibly be due to the concerned content getting disseminated across a wide geographical area. In the former case, we would prefer to modify the probabilities associated with the partitions to get the next wave to users from a wider geographical area, i.e., include users from more partitions. In the latter case, we would prefer to modify the probabilities to get the next wave to users in a narrower geographical area, i.e., include more users from lesser number of partitions.

It is important to note, in the above example, that to control the dissemination mechanism, we only have recourse to modifying the probabilities associated with the partitions, since the ratings are independently provided by the recipients.

It is also important to note that the kinds of reasoning by which we justified modifying the probabilities of the partitions is heuristic in nature. Different system administrators may wish to try other types of modifications to the probabilities to get a desired result, or to converge to (or approach) a desired result.

The dissemination mechanism, viewed in terms of size and composition of waves, is an inherently heuristic process. Therefore, the methods by which the dissemination process will be controlled and that are discussed below have a heuristic basis. The invention proposes that the size and composition of waves be monitored and modified during a dissemination process based on heuristics.

Reasoning such as shown in the above example will be called a strategy and the current invention is designed to learn from trying multiple strategies before settling on any one strategy. The term "learn" is used to in the sense that the invention may use machine or statistical learning techniques.

Consider the illustrative strategy below.
If the return ratio is increasing with respect to a partition, P, we reduce the selection probability for P for the next wave. If the rate is decreasing with respect to a partition, P, we increase the selection probability P for the next wave.

If the intended audience group has been partitioned by geographic regions, this strategy may imply that as more ratings are received from a certain region, we will add more users from other regions. If fewer ratings are received from a certain region, more users will be added from that region in the next wave. However, such a strategy is only based on heuristics.

For pedagogical reasons, we have used terms such as "high" and "low"; in practice, numeric estimations may be used to quantify the heuristic and its effects more accurately.

The present invention proposes a training phase for the system in which various strategies are tried for sample content dissemination exercises; we assume that the veracity of the sample content is known. Such training of heuristic software systems is well-known in prior art. The result of the training exercise is that the system settles into a heuristic that gives good performance.

Figure 2:
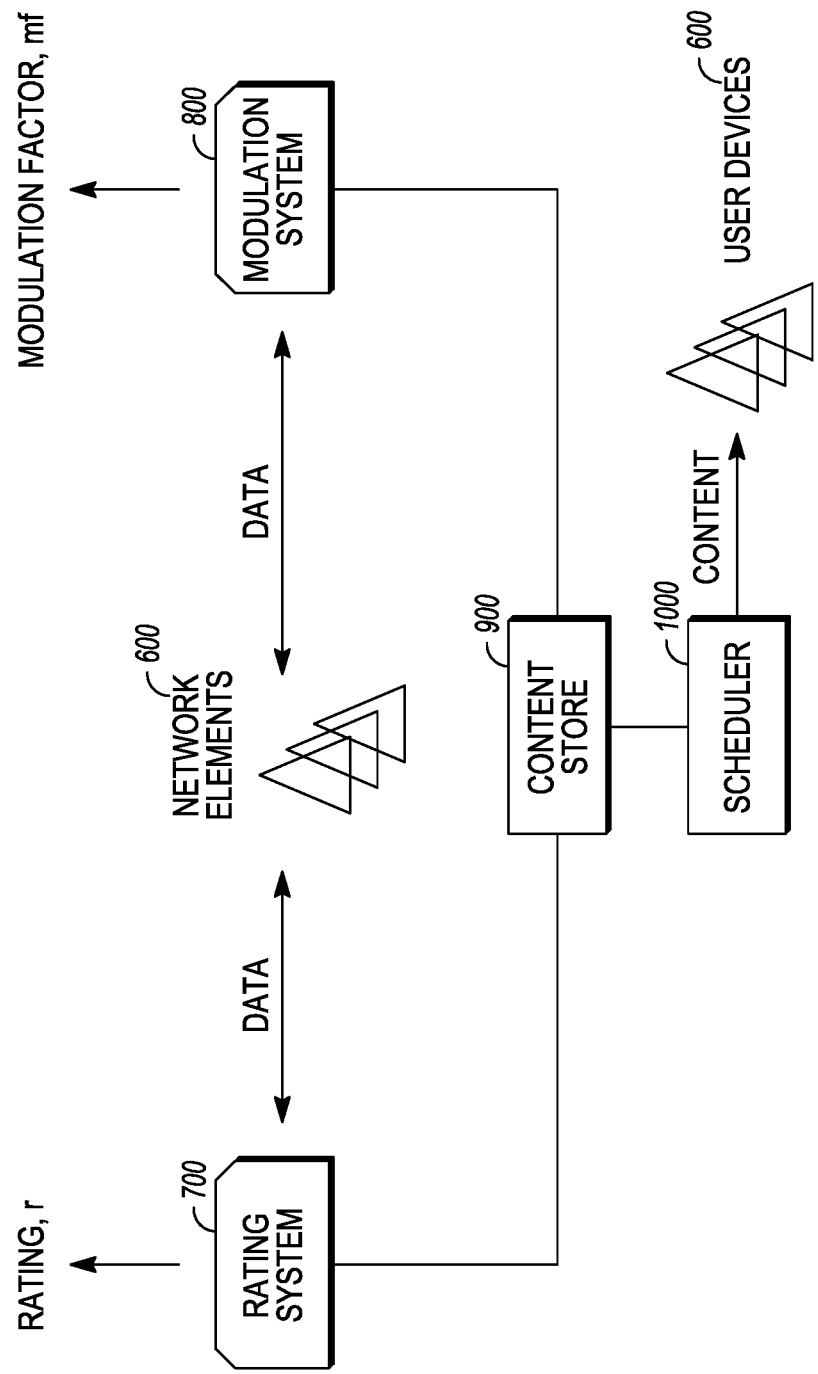
FIG. 2 is a simplified block diagram showing one example of a content dissemination mechanism that may be used to disseminate content to communication devices.

FIG. 2 shows a dissemination request 100 from a user device that begets an intended audience identified by user communication devices 600. A content dissemination mechanism is implemented by service logic running on a server complex 1000. The disseminating request 100 is received at the server complex 1000 where it is processed by programmed circuitry that causes the disseminated content to be scheduled for delivery to one or more user communication devices in network 600. The server complex 1000 comprises the Content Store 500, the modulation system 800, the rating system 700 and the scheduler 900. The posting causes a series of schedules (waves) of the content to be developed. The content is delivered by the scheduler or delivery engine 900 on a wave by wave basis.

The Rating System 700 associates a digital object called the "(composite) rating" with content that is to be disseminated. Initially, the rating value for a content may be null, i.e., have no value, since no recipients may have received and rated the content yet.

When a user receives disseminated content, he may rate it using service logic provided as a part of the disseminated content. For example, he may respond to a pop-up dialog box and provide a rating. The ratings provided by various users is returned to the rating system 700 that integrates the returned ratings to produce a (composite) rating. That is, the composite rating is "affixed" to or otherwise associated with the content so that it is accessible to the user.

When the next wave is delivered, the content is rendered on the user communication devices, inclusive of the affixed composite rating, which may be perused by the recipient users. For example, a user may see a numeric rating, say 6/10. Alternatively, the user may see the rating as a certain color (red/green/yellow). Such a user may also be provided an opportunity to rate the content. Thus, each wave results in users returning ratings that get integrated into the composite rating for each succeeding wave. The composite rating is affixed to or otherwise associated with the content and subsequent waves rendering the content also render or otherwise provided access to the rating for the benefit and use of users. Not all disseminated content may need to be rated; rather, a system policy may make such a determination. The rating system 700 uses the rating of content received from a previous wave to calculate the size of the next wave.

Similarly, the Modulation System 800 uses the return ratio of ratings by partition to adjust the composition of the next wave (by adjusting the probabilities associated with the partitions of the intended audience of the disseminated content).

Thus, content in the overall system may be thought of as a triple (c, r, mf) where "r" is the composite rating and "mf" is the modulation factor obtained by combining the individual partition probabilities (as detailed later). As new ratings arrive at the rating system 700, the "r" and "mf" values associated with "c" may be updated and revised, influencing the size and composition of the next wave.

All or some of the user communication devices 600 (cf. FIG. 2) may provide rating data for each piece of content in the content store 500. At a given time, the content store 500 may contain one or more pieces of content that are to be delivered to one or more groups of intended audiences (identified by their user communication devices). The system derives a delivery schedule on a wave by wave basis for each piece of content that is to be disseminated; the schedule is executed by a scheduler or delivery engine 900.

We now discuss the partitioning of the intended audience in more detail. Content to be disseminated begets an intended audience (users) identified by a group of user communication devices. We partition the intended audience into disjoint groups based on user attributes such as geographic location, domicile, gender, stated interest or expertise, etc. For example, we may partition the intended audience by state of residence. Alternatively, we may partition by gender or age group, etc. We may also partition the intended audience into several groups randomly.

Consider an intended audience IA (for content "c") consisting of 1 million members, partitioned into (N=50) partitions. Assume that we decide, based on default values, that the first wave will have a size, S, of ten thousand and the initial default probability for each partition will be equal to 2%.

Given a partitioning P1, P2, ..., P50 of the intended audience (IA), i.e., $$IA=P1 \cup P2 \cup \ldots \cup P50,$$

we randomly select S1 members from P1, S2 from P2, etc. Thus $$S=S1 \cup S2 \cup \ldots \cup S50$$

The number of members selected in S1 depends on the probability "p1" associated with partition "P1", etc. That is, we associate probabilities p1, p2, ..., p50, with partitions P1, P2, ..., P50 and select S1 members from P1 with probability p1, etc.

We may re-compute the partition probabilities for a second wave as follows.

We combine all the rating values returned from a partition P1 into a single value and refer to it as r(P1). We combine r(P1), r(P2), ..., for all the partitions into a single value and call it the composite rating of the first wave, e.g., r(wave1). Prior art teaches several functions that maybe used for combining individual ratings, for example, we may take the mean of all the individual ratings.

We combine the return ratio for each partition rr(P1), rr(P2), ..., into a single value and call it the modulation factor for the first wave, mf(wave1). Again, we may use one of many functions known in prior art to obtain a (normalized) combined probability for the second wave.

Given r(wave-1) and mf(wave-1) we obtain a composite rating "r(wave2)" and a composite modulation factor "mf(wave2)" by the pair of formulae F1 and F2:

$$F1: r(wave2)=r(wave1) \oplus mf(wave1)$$

$$F2: mf(wave2)=mf(wave1) \oplus r(wave1)$$

where the operators $\oplus$ are well-known in prior art for obtaining normalized and weighted means and other statistical measures.

We thus see that each succeeding wave can be assigned a composite rating and composite modulation factor that, in turn, determine the size and composition of the succeeding wave.

FIG. 3 shows the overall method of the system.

In initialization step 1, the content dissemination mechanism is configured to contain pieces of content, an associated rating value, "r", and a modulation factor "mf".

In initialization step 2, the content dissemination mechanism is configured to contain a list of users; each user may be associated with one or more groups of users.

In initialization step 3, the content dissemination mechanism is configured to receive ratings assigned by user communication devices for a given content. The received values are configured to be associated with the corresponding content.

In initialization step 4, the content dissemination mechanism is configured to assign rating metrics and modulation factors; these will be assigned to each wave as it is computed from the intended audience group.

Once the initialization steps have been executed, the system is ready to operate. It receives a first posting of new content (step 5). When new content "c" is received (from a user device that posts said content), the method assigns a default rating and default modulation factor and stores the resulting (c, r, mf) triple in the content store.

In step 6, the intended audience for the content "c" is partitioned into disjoint partitions based on one or more parameters, such as domicile, location, social category, gender, age group, etc. A subset G is selected from all partitions. (As explained above, the selection function is probabilistic. A probability is associated with each partition, set to a default value in the first step. The probability determines the likelihood of a certain element being selected from the given partition. These probabilities are modified based on the return ratios.) We further split the subset G into a first "wave" and the "remainder of G", with the latter being added back to the intended audience. Next, we develop a delivery schedule for the first wave recipients and output that schedule. We re-name the "remainder of G" as G.

In step 7, having output the delivery schedule for the first "wave", the content dissemination mechanism executes three procedures "R", "M" and "CSI" contemporaneously until the intended audience list for "c" becomes empty. Note that as procedures "R", "M" and "CSI" execute, new dissemination commands may be received for content "c", e.g., content "c" maybe re-tweeted, which may necessitate updates to the intended audience group. Thus, the selection method that selects members to be selected from IA can only be allowed to terminate when the IA group becomes empty.

We may visualize the working of procedures "R", "M" and "CSI" as follows. We receive an initial content "c" that leads to a calculation of the intended audience IA. As re-tweets or new "likes" happen, the IA list gets updated. Contemporaneously, probabilistically selected disjoint subsets G are extracted from IA and processed. The processing of G is done by first processing one of its subsets (first wave) and then the remaining members get added back to the intended audience group IA. Once the first wave has been processed, a new IA is formed, a new G is selected and a new subset of G (next wave) is selected. The process continues until the intended audience group becomes empty.

More precisely, the functioning of step 8 (FIG. 3) can be explained as follows.

(Step 8): Procedure "R" receives new ratings data from user communication devices for content "c", calculates new ratings "r" based on formula F1 (defined below), reads new modulation factor "F2" (defined below) from procedure "M", and creates the pair (c, new rating "r"). It stores the newly created pair in the content store.

(Step 8): Procedure "M" reads velocity data for each partition related to content "c", new ratings "F1" for content "c" from procedure "R", generates a new "mf" using formula F2 and creates the pair (c, mf). It stores the newly created pair in the content store.

(Step 8): Procedure CSI reads the triple (c, r, mf from the content store). It calculates the new IA for content "c". Next, it splits the intended audience into a first wave and the "remainder" (as explained in step 6 above) and outputs the delivery schedule for the first wave. As the procedure repeats execution, users belonging to IA are selected as per the modulation factor until IA becomes empty, i.e., all intended recipients have been served.

Figure 4:
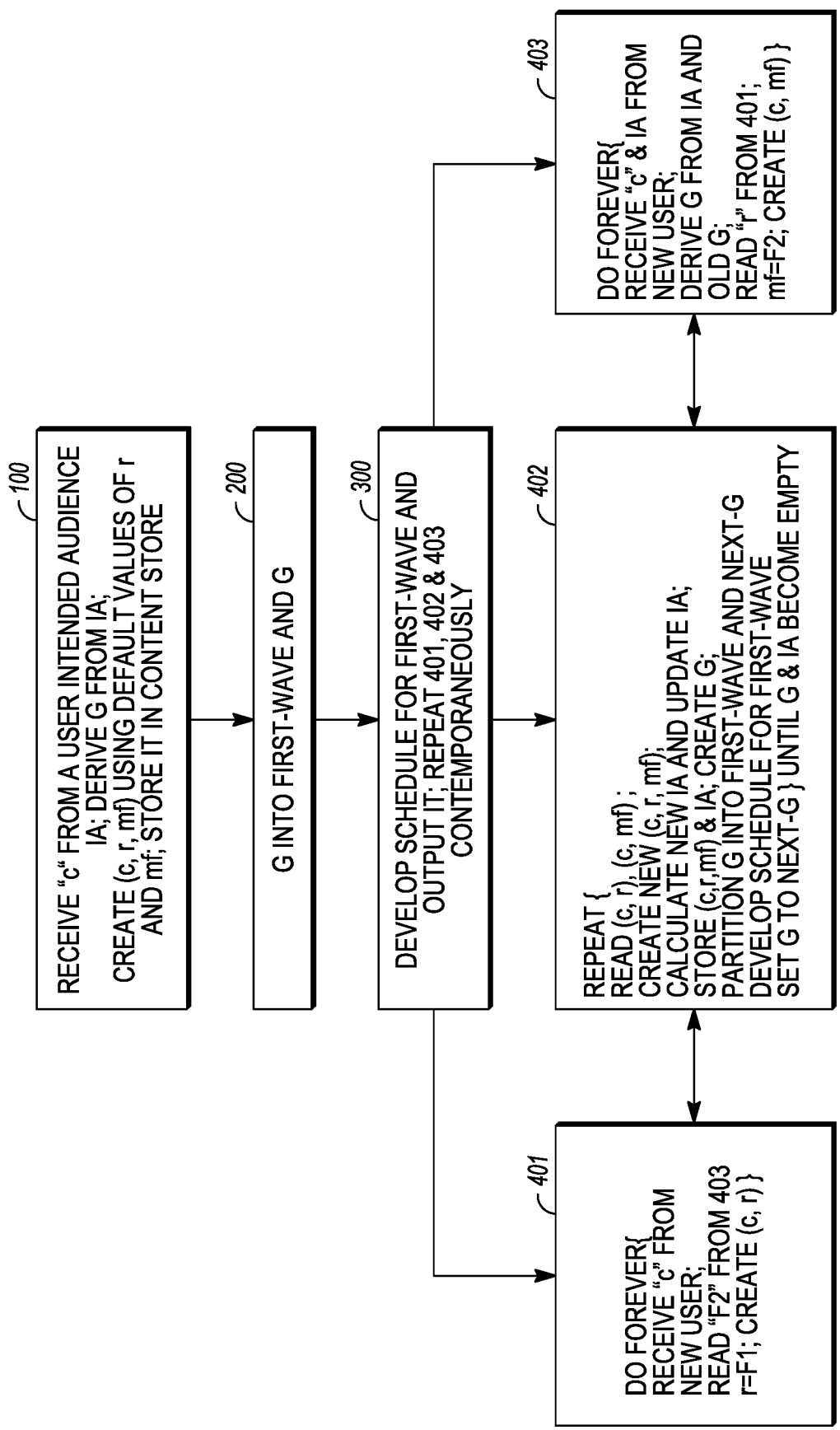
FIG. 4 further illustrates the method shown in FIG. 3.

The general method of FIG. 3 may be summarized as in FIG. 4. In step 100, new content is received from user "U" leading to the creation of the triple (c, r, mf) where "r" and "mf" are default values. Content "c" has an intended audience IA.

In step 200 we select the group G from the IA as explained above and create a first wave.

In step 300, we develop a schedule for members of first-wave and output the schedule.

Steps 401, 402 and 403 are executed contemporaneously.

The purpose of 401 is to receive the content "c" (due to a re-tweet or a new "like" action) from a new user and its ratings from the previous wave. Note, that content "c" is the same content that was processed in step 100; it has now been re-tweeted or "liked" by a new user. Content "c" may have a new intended audience that is used to derive a new group G. Step 401 creates data (c, r) that may be read by 403. Similarly, step 403 creates data (c, mf) that may be read by 401. Step 402 retrieves (c, r, mf) in its memory, calculates the new IA, selects a subset G of IA and outputs its schedule. Step 401 and 403 use formulae F1 and F2 respectively that are defined below.

We describe several embodiments to implement the Rating System. In one embodiment, a group of human experts are used to curate the incoming content postings and assess a rating to each posted content. The ratings from each human curator are combined in a formula. Prior art teaches several ways of computing confidence values from a given set of values, e.g., Fischer style test statistics.

In another embodiment, a group of smart programs are utilized to mechanically assess the veracity of a given piece of content and a rating is assigned by the smart program. Again, the individual ratings may be combined as in the above embodiment.

In a third embodiment, a combination of human and smart programs may be used to implement the Rating System.

In yet another embodiment, a group of users of the dissemination system are recruited to serve as human curators. For example, dissemination systems such as Facebook and Twitter provide apps that are downloaded by users who are then able to receive disseminated content on their user communication devices using the downloaded app. Such users are also asked to provide a user profile when downloading the app. We envision adding a few questions to the user profile, responses to which serve to identify their location, their political and social interests, gender, etc. Thus, the user community may be divided into one or more partitions using profile information. Content that needs to be disseminated and is to be rated piece is then sent to a group of human users selected randomly from the various partitions. Prior art in sampling theory teaches several techniques to randomly select samples from a given population of partitioned users.

It remains to discuss the calculation of F1 and F2. Note that F1 is needed in step 6 & R-8c (cf. FIGS. 3) and F2 is needed in step 6 & M-8c (cf. FIG. 3).

In step 6 (FIG. 3), we use default values r1, r2, etc., that may be pre-determined by system administrators. In step R-8c (FIG. 3) we use the ratings values received from the last "wave" of users who returned their ratings and the most recently read value of "F2" from procedure "M" (FIG. 3).

Turning now to the calculation of the modulation factors, we note that their calculation occurs in step 6 (FIG. 3) and step M-8c (FIG. 3).

The calculation of the modulation factors is based on the return ratios for each partition and uses formula F2 described above.

We see that delivery of content to an intended audience may be controlled in real-time by ratings provided from the members of the audience themselves. At first glance, it may appear that our method introduces a latency in the delivery process, i.e., delivery to members of the intended audience will be delayed. This is not true for large sized audiences. We reason as follows.

Delivering content to millions of subscribers may take time of the order of hours since traffic bandwidth and capacity is costly. The actual impact of our method is to re-arrange the order in which the members receive the content. So, while, certain members may receive content earlier than other members, the randomization element will compensate such inequities over multiple deliveries. As a simple example, consider a neighborhood of homes to which a delivery is scheduled. By re-arranging the order of delivery, we may serve certain homes first but all homes will be served eventually, and the serving time for each home will vary randomly across multiple deliveries. (The network paths followed by the delivery schedule may indeed be longer but the time to traverse these paths may be ignored in computer networking given the speed of electromagnetic radiation.)

The impact of such re-ordered schedules on fake news would be enormous. One aspect of the spreading of fake news is that it spreads fastest amongst members that may be grouped by geographic region (location) or social category, etc. Consider two groups of users partitioned into groups by location. Re-ordering the delivery to certain members of group "A" allows the ratings from the other group "B" to be integrated into the system. Thus, members of the first group "A" receive content with the integrated ratings and may benefit by observing the rating as displayed or rendered on their devices. Similarly, ratings observed by members of group "B" are integrated with ratings from members of group "A".

In contrast, a delivery schedule that overwhelmingly serves members of group "A" first will lead to the phenomenon that members of group "A" will observe ratings that re-inforce their own group's ratings since the integration is limited to ratings from their own group, i.e., the group members re-inforce each other's ratings. In the absence of ratings, this phenomenon reduces to members of the group receiving content mostly from its own group. Such a phenomenon has been called a "bubble".

While the introduction of ratings does not eliminate "bubbles", it allows members of a bubble to receive content whose ratings result from integration across other bubbles. If we consider the case of a fake piece of content that is later "corrected", we see the impact of our proposal clearly as follows.

In current practice, since content is delivered without ratings and without regard to modulating of delivery schedules, a group of users receives content and the received content is shared widely amongst the members of the group. Later, a correction to the content is made and it may or may not be shared equally, i.e., the sharing may not be at par with the original content. The "attention" of the audience may have "moved on". Alternatively, the audience may have made up its mind and the correction may be ignored. These are the hallmarks of being in a "bubble".

One impact of our invention is to interleave the ratings into the delivery of the original content. Some members will receive the original content with the original rating (and the default ratings may be set to limit the number of such deliveries), but other members will receive content with the integrated ratings (original plus corrected). The latter group of recipients create additional waves of dissemination in their group, thusly, more and more members of said group to receive the new integrated ratings. The homogeneity of ratings across a bubble is shattered.

Implementing the Modulating and Rating Systems

Various embodiments of the modulating and rating systems described above may need to satisfy certain requirements. For instance, in some cases the systems may need to withstand gaming and other such attacks to alter the ratings of content, alter the rate of content dissemination, etc.

Second, the systems may need to be inscrutable with respect to the identity of raters, since we may expect that unfavorable ratings may elicit unwanted messages to a rater.

Finally, the needs of a large community of users will be best served if the systems were open and the data available for scrutiny while maintaining security at the same time.

Figure 5:
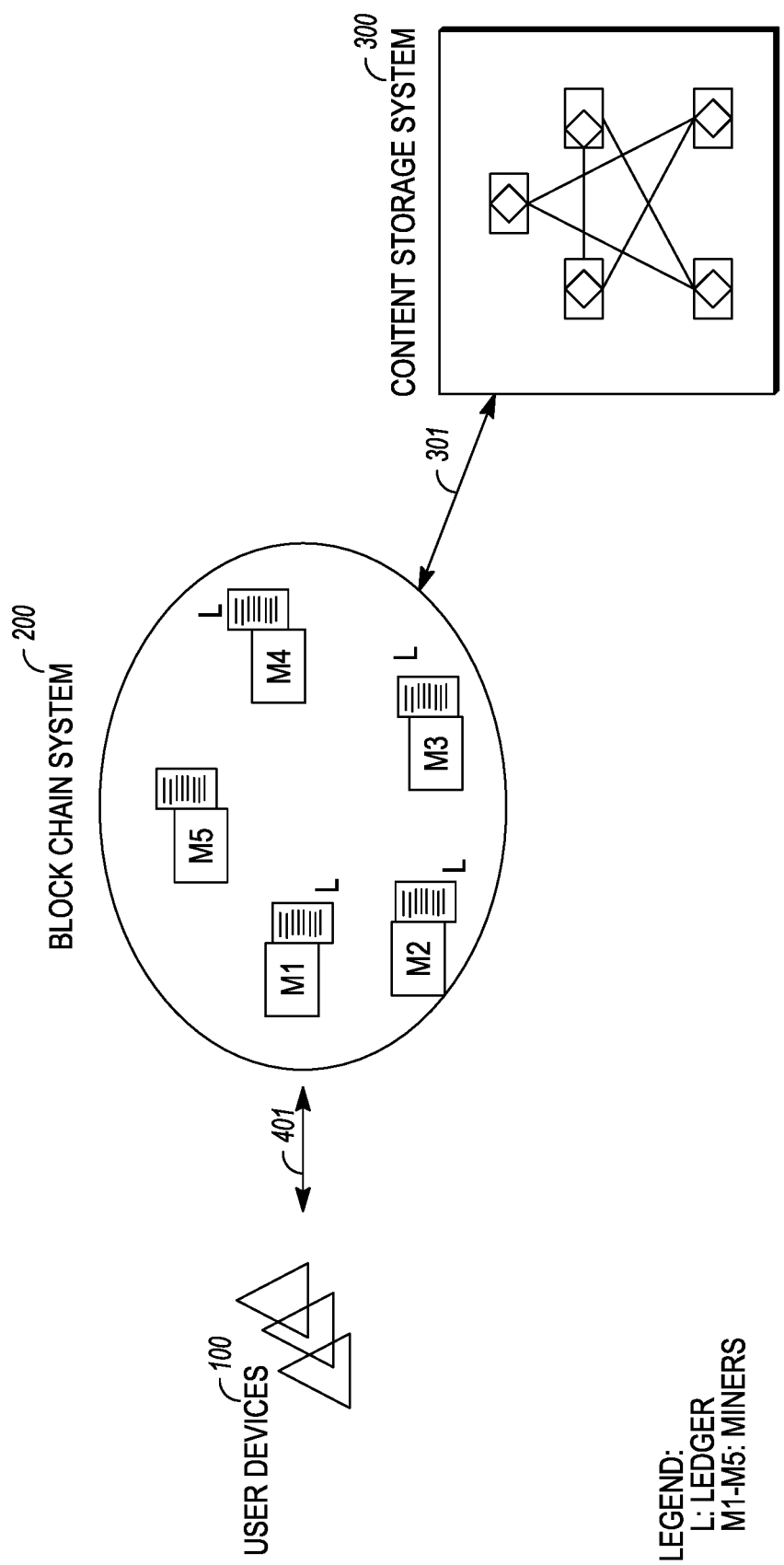
FIG. 5 is a simplified block diagram showing another example of a content dissemination mechanism that is implemented as a blockchain.

FIG. 5 shows the architecture for implementing the content dissemination mechanism using blockchain technology.

The content store may be implemented as a distributed database shown as 300 (FIG. 5). User communication devices 100 connect to a network of inter-connected computers called miners, M1-M5, comprising the blockchain system 200. The miners may access the content store using interface 301 and the user communication devices, also referred to as clients, may access the miners and receive content from them via interface 401. Typically, a client may access one or more miners; in our example, we assume that clients are configured to access a miner via a pre-determined assignment.

Each miner has access to a local memory called the ledger, denoted by "L" in FIG. 5. A miner always has access to its ledger and may read and write data into the ledger. Typically, in conventional blockchain systems, the data in the ledger may be in the clear or it may be encrypted.

The miners are inter-connected and may use a protocol to convey messages to each other. One such protocol mechanism may use broadcasting technology. Each miner works independently from other miners and only accesses its own ledger. The number of miners in the network may be determined by the system administrators. For exemplary reasons, we have chosen 5 miners.

All miners contain the same service logic. In the current embodiment, the service logic is the method of FIG. 3 with the following additions. These additions pertain to what is known as the "consistency procedure".

A client wishing to post content (to his friends list) transmits the content to its pre-determined miner using interface 401. The miner receives the content, adds, i.e., records, it in its ledger as a task to be executed and broadcasts the received content to all other miners. Each miner who receives the broadcast content also records the received content in its ledger. In some implementation, the broadcasting methodology may use a "next-hop" strategy for its broadcasts as is described in prior art. Thus, all miners are assumed to receive all broadcasts. (Network splits wherein a subset of miners or a sub-network gets disconnected are handled via special mechanisms known in prior art.)

A miner with a task to be executed as recorded on its ledger proceeds as follows. It executes the task, in this case the posting of the content using the method of FIG. 3. Note that the method of FIG. 3 runs by delivering content to its intended audience one "wave" at a time. A miner having developed a schedule for a wave to be delivered, announces its completion to all the other miners (who may be working on completing the schedule for the same wave).

A first miner upon receiving an announcement that a second miner has completed the schedule of delivery for a wave stops working on its version of the schedule and starts working on scheduling the next wave. In blockchain terminology, this action is called generating a new block of the blockchain. The newly developed block is transmitted to all miners who incorporate the new block into their ledgers. The previous block is discarded. The previously discarded blocks are considered as alternative histories of the blockchain that have not materialized and have been abandoned. Only the accepted block leads to newer blocks and represents a consistent chain of history of the blockchain.

Thus, several miners contemporaneously work on developing a delivery schedule for a wave and the first to succeed gets to add a new block to the blockchain. The ledger may be viewed as a series of blocks added over time and represent the historical state of the system.

One or more miners may also contain software logic representing a delivery engine. Alternatively, the delivery engine may be implemented on a separate group of computers. A delivery engine is software logic that accepts a delivery schedule and executes the schedule resulting in the delivery of content to the specified devices (clients) listed on the schedule. As schedules get developed and added to the new block, one or more versions of the delivery engine may select such a schedule and cause its specified content to be delivered, i.e., execute the schedule.

Figure 6:
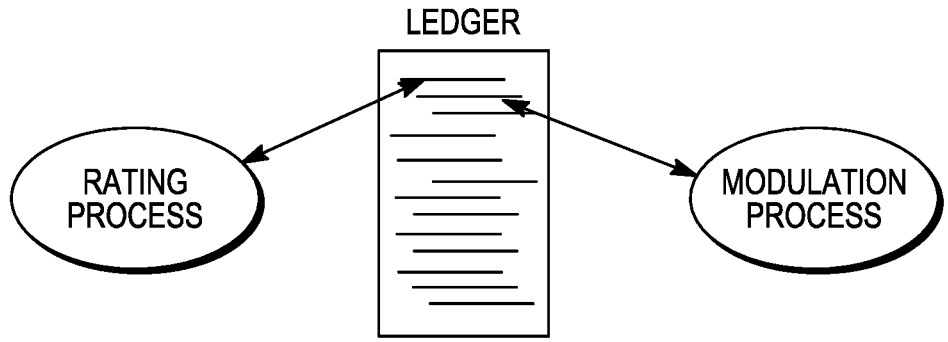
FIG. 6 shows a ledger that may be employed in the content dissemination mechanism of FIG. 5, which be used as a local memory for the rating and modulation processes.

It is to be noted that the ledger may not only be used to contain the developed delivery schedules, but may also be used as local memories for the rating and modulation processes as shown in FIG. 6. In conventional systems, such an architecture is sometimes referred to as a smart contract, i.e., the rating and modulation processes may be implemented as smart contracts on the blockchain.

Figure 7:
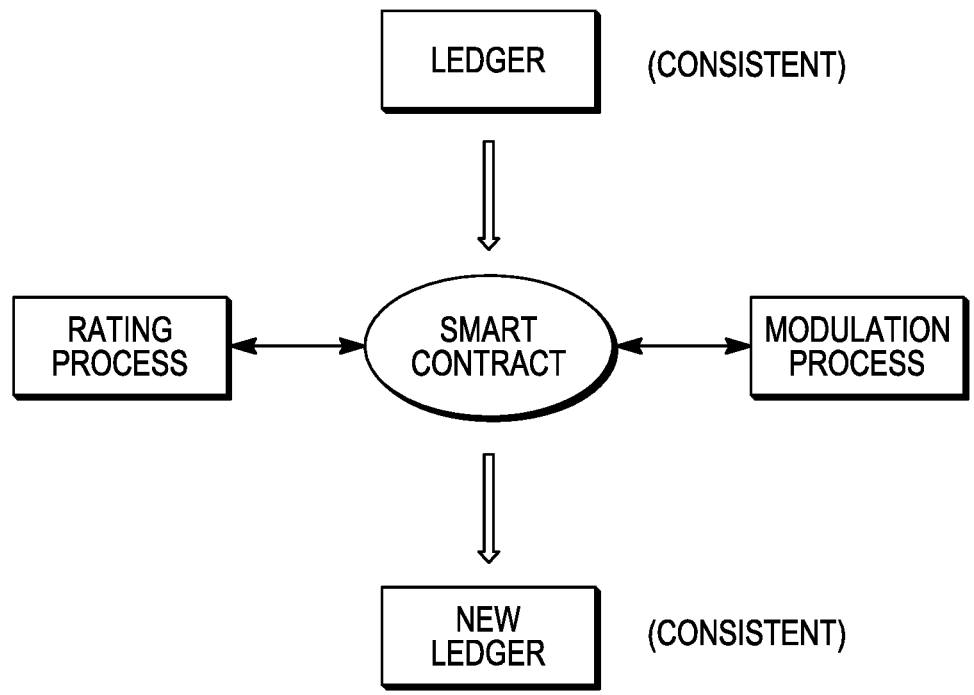
FIG. 7 illustrates how the rating and modulation processes may be implemented as smart contracts in the content dissemination mechanism of FIG. 5.

FIG. 7 emphasizes that by using smart contracts on the blockchain we may ensure that the ledger data is always consistent and represents a valid delivery schedule for the posted content.

GAMING THE RATINGS

When a user (client device) receives disseminated content, the rendering of the content may delineate a rating value, say 6/10 or a color scheme such as "yellow". We propose that the rating value be represented by a hyperlink that may be clicked by the user to verify the displayed value in a sense described below.

The gaming aspect of the rating is subtle. In one aspect, gaming refers to the notion that the rating has not been hacked, i.e., a malicious entity provides a rating object to a client that is fake. In another aspect, gaming the rating implies an understanding that the value represents "confidence" in the operation of the overall system. We address both such aspects as follows.

In one embodiment, the present invention uses a library known from prior art to create computational keys called the proving key and the verifying key from the calculated rating value F1, i.e., the rating value is treated as a secret. It is important to note that the probe and the proof have the property that it is computationally infeasible to create (malicious) objects that can be substituted for either the proof or the probe and retain the functioning of the various library functions. The term "computationally infeasible" is well known in prior art; in simple language, it means that no computationally efficient methods are known to solve the problem.

Figure 8:
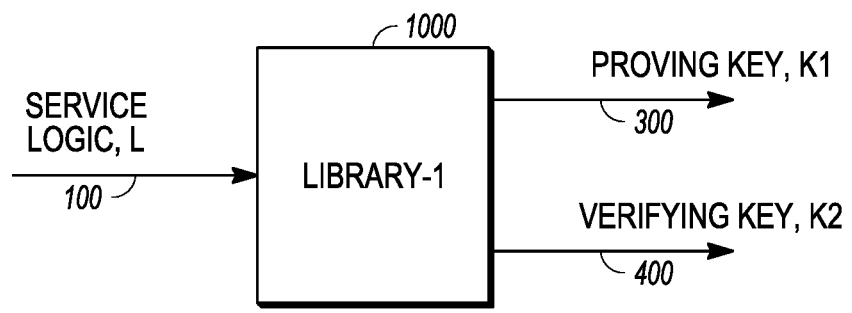
FIGS. 8-10 show examples of a library that may be used to create computational keys for securing protecting the ratings from tampering.

FIG. 8 shows a library called Library-1 that accepts service logic, L, and generates two cryptographic keys called K1 (proving key) and K2 (verifying key). In one embodiment, the service logic of rating system (700, cf. FIG. 2) is processed by Library-1 to generate the keys, K1 and K2.

In one embodiment, the rating system (700, cf. FIG. 2) receives individual ratings and computes the integrated rating, F1 (FIG. 3). The F1 value is encoded and encrypted to obfuscate and secure it. The resulting object may simply be referred to as (encrypted and obfuscated) data.

Figure 9:
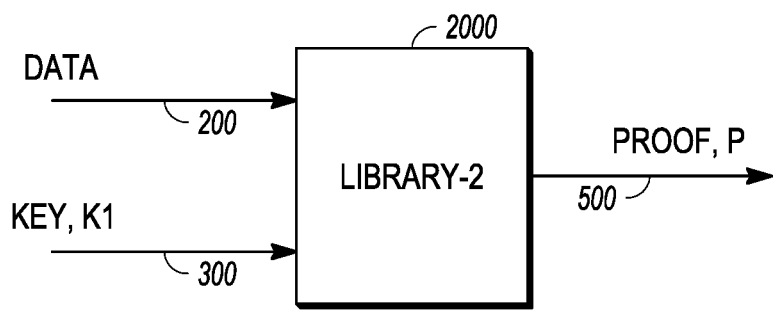

FIG. 9 shows a second library, called Library-2, that accepts data 200 and (proving) key K1 300 and produces an object called a proof P, 500. In one embodiment, the proof P may be sent by the rating system to a client where it may be rendered as a component of the delivered content. The client thus receives two objects, the rating data that is encrypted and obfuscated and the proof object, P.

Figure 10:
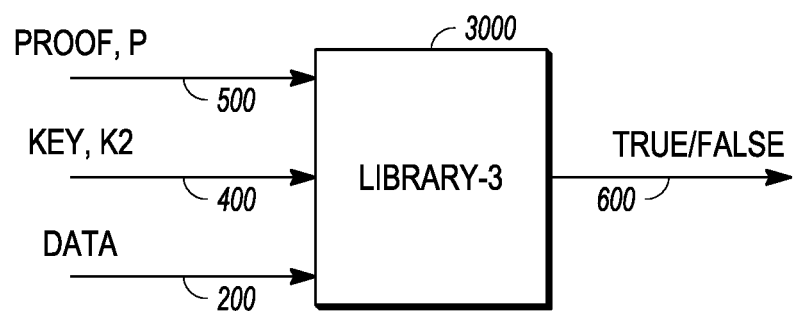

FIG. 10 shows a third library, Library-3, that accepts Data 200, (verifying key) K2, and a proof object P and produces a true/false answer signifying validity of the object "P". In one embodiment, a client provided with Library-3 may use it to validate a received rating data and the proof object.

We claim that the use of Library-1, Library-2 and Library-3, in implementing the rating system provides solutions to the gaming of the ratings problem as follows.

The present invention proposes that a link (equivalently, hyperlink on the Internet) may contain logic to check its own validity. The result of clicking such a link would be a non-deterministic process with multiple outcomes:
 (1) The link refers to an object that is verified.
 (2) The link refers to an object that is unverified and the user is offered multiple possible options, such as "report unverified rating".

The rating system provides obfuscated and encrypted data to the client that may render it for a user using a "color" based rating scheme as described above. A user wishing to ascertain the validity of the displayed rating may click the rendered rating object. This causes logic of the client to execute Library-3 and results in establishing the validity of the rendered rating. A system administrator wishing to ensure the overall integrity of the rating system may regenerate the proving key and use it to establish that the service logic of the rating system was used to generate the keys K1 and K2, i.e., the logic of the rating system is unchanged from the version that generated the keys.

FURTHER EMBODIMENTS

The embodiments described above have been based on ratings received from users who receive disseminated content. The ratings pertain to the accuracy and truthfulness of the content. We extend the notion of ratings to include relevance of content to an intended recipient.

First, consider a network of smart inter-connected programs that exchange data by using a broadcast or other one-to-many protocols. A program may compute or derive a (probabilistic) decision and may broadcast it to multiple other computers. The decision may contain as a component the confidence measure in the decision, e.g., an accuracy estimate. Recipients of such messages may not wish to receive messages unless or until the confidence exceeds a certain threshold. For example, in sensor-based networks, many hundreds or thousands of sensors may be deployed and many messages may be transmitted by these sensors. Recipients may then wish to "register" only for those messages that satisfy a confidence threshold.

Many processes on the Internet use a mechanism called "publish and subscribe". For example, news websites may publish many articles and a client may subscribe to a subset of the published articles by specifying a list of subjects to "filter" the published articles. The list of subjects that the client is interested in may be viewed as a "relevance rating".

Finally, consider a collection of smart cars that sense various environmental indicia from their surroundings and broadcast the data to one or more traffic control devices. Note that the traffic control devices may have a physical manifestation in a geographical environment, but they may also have a virtual manifestation in a cloud network. In such a case, there may be hundreds or thousands of virtual instances in the cloud corresponding to physical traffic devices installed in a geographical region. A virtual traffic device may wish to register only for those (broadcast) messages that pertain to a fragment of its geographical context. For example, a virtual traffic device representing the intersection of $48^{th}$ street and $3^{rd}$ Avenue may only be interested in messages emanating from smart cars near said intersection, where the boundary of the vicinity may be set by a pre-determined parameter. A smart car may then use its GPS capabilities to determine its position and calculate its proximity to the area of interest for the (virtual) traffic light and encode it as a type of "proximity rating".

Thus, a "relevance rating" or a "proximity rating" may be assigned to content by the sender. Now, clients who have specified filtering criteria may use the rating to filter the content. A client then receives only the content that is allowed by the filter.

The filtering mechanism ay be implemented on the receiving device or on an intermediate device that disseminates the content to the recipient devices after filtering the content.

To handle embodiments such as described above, we allow a content receiving entity to specify a "filtering criteria", i.e., it registers to receive content only if the content satisfies the filtering criteria.

We observe that the method described in FIG. 3 constructs a delivery schedule that is then executed by a scheduler. We modify the method of FIG. 3 to include only those members of the intended audience whose filtering criteria is satisfied by the content to be disseminated. Thus, membership in a delivery schedule may be viewed as "conditional membership" in the sense that delivery to a conditional member is effectuated only if the filter criteria is satisfied.

To implement the proposed modification, we observe that the development of the delivery schedule may be modified to exclude the conditional members in the delivery schedule. Alternatively, conditional members may be included in the delivery schedule, but the scheduler may be configured to only deliver to those recipients whose filtering criteria is satisfied.

Thus, either the process that develops the delivery schedule or the scheduler process may be modified to effectuate the proposed change.

Figure 11:
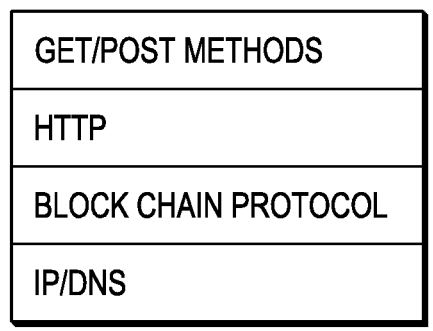
FIG. 11 shows an example of an Internet protocol stack in which the "post" and "get" methods of the HTTP protocol may be modified to support the method of FIG. 3.

As another embodiment consider the implementation of the present invention in the Internet data network. We propose that the "post" and "get" methods of the HTTP protocol may be modified to support the method of FIG. 3 and its extensions described herein. FIG. 11 shows one possible software stack that could be used in the browsers and web servers of the Internet. Such an implementation would lead to efficient implementations of the concepts of the present invention.

Figure 12:
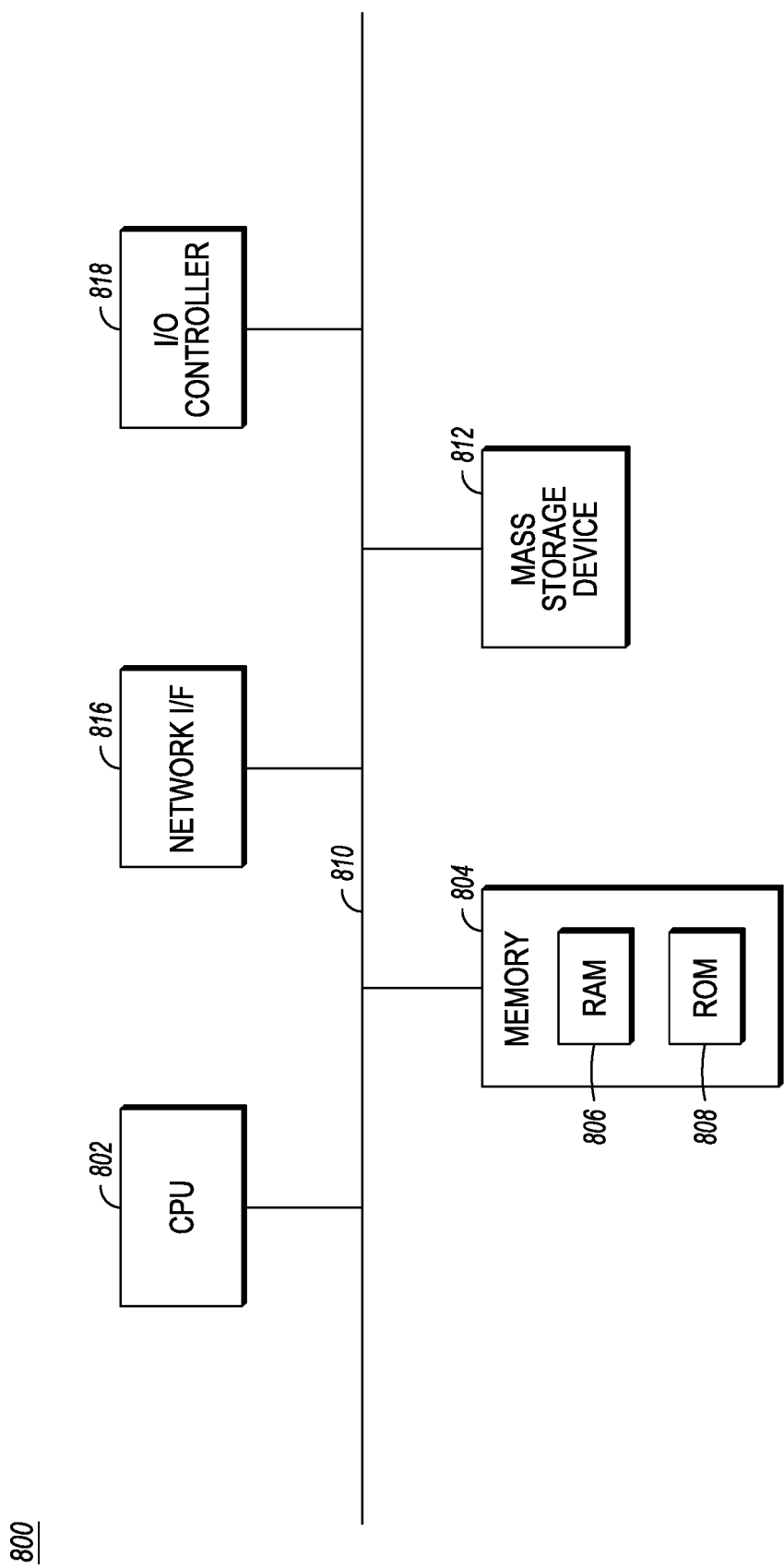
FIG. 12 shows an example architecture for a device such as the user communication devices or server complex shown in FIG. 2 which are capable of executing the various components described herein for implementing aspects of the content dissemination techniques described herein.

FIG. 12 shows an example architecture 800 for a device such as the user communication devices or server complex shown in FIG. 2 which are capable of executing the various components described herein for implementing aspects of the content dissemination techniques described herein. Thus, the architecture 800 illustrated in FIG. 12 shows an architecture that may be adapted for a server computer, mobile phone, a PDA, a smartphone, a desktop computer, a netbook computer, a tablet computer, GPS device, gaming console, and/or a laptop computer. The architecture 800 may be utilized to execute any aspect of the components presented herein.

The architecture 800 illustrated in FIG.12 includes a CPU (Central Processing Unit) 802, a system memory 804, including a RAM 806 and a ROM 808, and a system bus 810 that couples the memory 804 to the CPU 802. A basic input/output system containing the basic routines that help to transfer information between elements within the architecture 800, such as during startup, is stored in the ROM 808. The architecture 800 further includes a mass storage device 812 for storing software code or other computer-executed code that is utilized to implement applications, the file system, and the operating system.

The mass storage device 812 is connected to the CPU 802 through a mass storage controller (not shown) connected to the bus 810.The mass storage device 812 and its associated computer-readable storage media provide non-volatile storage for the architecture 800.

Although the description of computer-readable storage media contained herein refers to a mass storage device, such as a hard disk or CD-ROM drive, it should be appreciated by those skilled in the art that computer-readable storage media can be any available storage media that can be accessed by the architecture 800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 800.

According to various embodiments, the architecture 800 may operate in a networked environment using logical connections to remote computers through a network. The architecture 800 may connect to the network through a network interface unit 816 connected to the bus 810. It should be appreciated that the network interface unit 816 also may be utilized to connect to other types of networks and remote computer systems. The architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8).

It should be appreciated that the software components described herein may, when loaded into the CPU 802 and executed, transform the CPU 802 and the overall architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 800 in order to store and execute the software components presented herein. It also should be appreciated that the architecture 800 may include other types of computing devices, including handheld computers, embedded computer systems, smartphones, PDAs, and other types of computing devices known to those skilled in the art. It is also contemplated that the architecture 800 may not include all of the components shown in FIG. 12, may include other components that are not explicitly shown in FIG. 12, or may utilize an architecture completely different from that shown in FIG. 12.

The invention claimed is:

1. A method of controlling dissemination of content to communication devices over one or more communication networks, comprising:
   receiving, by a content dissemination mechanism, a message reflecting a user-initiated action that is to cause dissemination of a given content item to a plurality of communication devices each associated with a user;
   responsive to the message, identifying a group of communication devices to which the given content item is to be disseminated;
   determining a first subset of the identified group; and
   disseminating the content item to a first subset of communication devices in the identified group; wherein
   the determining being based at least in part on a first ratings formula derived at least in part from ratings of the given content item provided by users to whom the given content item has already been disseminated, wherein determining the first subset of the identified group further comprises determining a composition of the first subset of communication devices by selecting individual ones of the communication devices to be included in the first subset of communication devices by
   (i) partitioning the identified group of communication devices into a plurality of partitions that each contain a subgroup of the communication devices in the identified group of communication devices, and
   (ii) selecting a first prescribed number of communication devices from one or more of the partitions, a number of communication devices from each partition being based at least in part on a first composition formula derived at least in part from a return ratio of ratings for each partition, the return ratio for each partition being a ratio of a total number of ratings of the given content received from communication devices that were selected from each respective partition to a total number of communication devices that were selected from each respective partition and which received the given content item.

2. The method of claim 1 wherein the partitioning is based at least in part on one or more attributes of the users with which the communication devices are associated.

3. The method of claim 2 wherein one of the attributes is a geographic location of the users.

4. The method of claim 1 further comprising selecting a smaller number of communication devices from partitions having a return ratio associated therewith that is increasing over time as ratings are provided by users and a greater number of communication devices from partitions having a return ratio associated therewith that is decreasing over time as ratings are provided by users.

5. The method of claim 1 further comprising:
   determining a second subset of the identified group of communication devices;
   disseminating the given content item to the second subset of communication devices in the identified group, wherein determining the second subset is based at least in part on a second ratings formula derived at least in part from ratings of the given content item provided by users in the first subset of communication devices, the second subset of communication devices excluding the communication devices in the first subset of communication devices.

6. The method of claim 5 wherein the second ratings formula is also based at least in part on the composition of the first subset of communication devices.

7. The method of claim 5 further comprising updating the identified group to include one or more additional communication devices to which the given content is to be disseminated based on receipt of a message from one or more of the communication devices in the first subset of communication devices, the message reflecting a user-initiated action that is to cause dissemination of the given content item to the one or more additional communication devices.

8. The method of claim 7 wherein determining the second subset of communication devices further comprises determining a composition of the second subset of communication devices by selecting individual ones of the communication devices to be included in the second subset of communication devices by (i) partitioning the updated identified group of communication devices, exclusive of the communication devices in the first subset of communication devices, into a plurality of partitions that each contain a subgroup of the communication devices in the updated identified group of communication devices, and (ii) selecting the second prescribed number of communication devices from one or more of the partitions, a number of communication devices from each partition being based at least in part on a second composition formula derived at least in part from a return ratio of ratings for each partition, the return ratio of ratings for each partition being a ratio of a total number of ratings of the given content received from communication devices in the first subset that were selected from each respective partition to a total number of communication devices in the first subset that were selected from each respective partition and which received the given content item.

9. The method of claim 5 wherein the disseminating includes disseminating to the second subset of communication devices the given content item and a composite value indicative of the ratings of the given content item provided by users in the first subset of communication devices.

10. The method of claim 9 wherein composite value indicative of the ratings is provided as a cryptographically secure object.

11. The method of claim 10 wherein the ratings object can be verified by a recipient.

12. The method of claim 5 wherein the determining the second subset of communication devices is based in part on a rating threshold provided by the communication devices in an initialization step.

13. The method of claim 1 wherein the number of communication devices being selected from each partition to define the first subset of communication devices is also based at least in part on ratings of the given content item provided by users to whom the prescribed content item has already been disseminated.

14. The method of claim 1 wherein the first composition formula is also derived at least in part from the ratings of the given content item provided by users to whom the prescribed content item has already been disseminated.

15. The method of claim 1 wherein the ratings reflect user perceptions of a veracity of the given content item.

16. The method of claim 1 wherein the ratings reflect a relevance of the given content item to users of the communication devices to which the given content item is to be disseminated.

17. The method of claim 1 further comprising implementing the disseminating using a blockchain system.

18. The method of claim 17 further comprising determining the first subset of the identified group using a smart contract on the blockchain system.

19. The method of claim 17 further comprising determining the composition of the first subset using a smart contract on the blockchain system.

* * * * *